May 13, 1958  J. W. DEER  2,834,215
GRAVITY SENSING POTENTIOMETER
Filed March 18, 1957
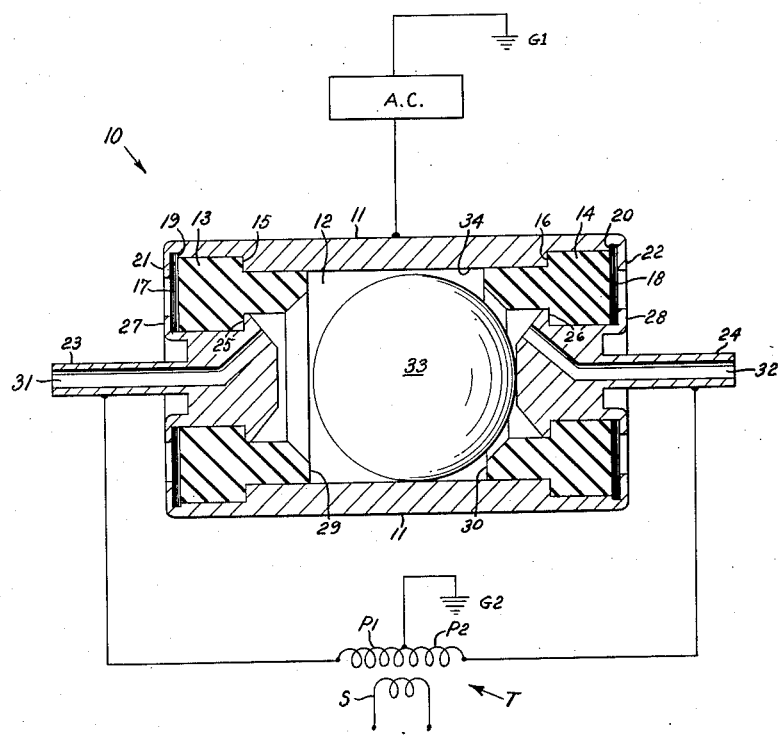
INVENTOR
James W. Deer
BY
AGENT

2,834,215

GRAVITY SENSING POTENTIOMETER

James W. Deer, Portland, Oreg., assignor to Iron Fireman Manufacturing Company, a corporation of Oregon Application March 18, 1957, Serial No. 646,908

6 Claims. (Cl. 74—5.47)

This invention relates generally to an electrical resistance structure of the potentiometer type which may be used for voltage dividing or phase shifting in a part of a circuit in which it may be connected, but more particularly relates to such a structure in which the voltage dividing or phase shifting function is responsive to variation of the position of the structure relative to a gravity vertical reference.

It is the primary object of the invention to provide a position sensitive means which is substantially insensitive to vibration over a wide range of frequency and amplitude but highly sensitive to change of position relative to a gravity vertical reference.

A second object is to provide such a position sensitive structure having novel parts associated in novel ways to provide the structure with unique sensitivity and utility.

A preferred form in which my invention may be practiced is fully disclosed in the following description referring to the attached drawing. The single figure of the drawing shows an elevation in partial section along a vertical center plane of the gravity sensing potentiometer of the invention together with a fragmental schematic showing of an electrical circuit in which the gravity sensing device may be usefully employed.

Referring now to the drawing the numeral 10 indicates generally my gravity sensing potentiometer having a generally cylindrical outer shell or center electrode 11 formed of an electrically conducting material compatible with a fluid electrolyte with which the interior space 12 of the device is filled. Set into the ends of shell 11 are a pair of electrolyte impervious electric insulators 13, 14 held in place respectively between shoulders 15, 16 of shell 11 and hermetic seals 17, 18 held in place respectively between shoulders 19, 20 of shell 11 and the inwardly spun end flanges 21, 22 of shell 11. End electrodes 23, 24 are secured coaxially with the shell 11, as shown, by clamping insulators 13, 14 and seals 17, 18 between the respective shoulders 25, 26 and outwardly turned flanges 27, 28, of end electrodes 23, 24. Holes 31, 32, in end electrodes 23, 24 are closed after space 12 is filled with electrolyte therethrough.

It should be noted that between the inner end surfaces 29, 30 of insulators 13, 14, center electrode 11 has a large cylindrical surface in contact with the electrolyte in space 12. Also over their inner end frusto-conical surfaces end electrodes 23, 24 each have a large area in contact with the electrolyte in space 12.

Immersed and partially supported in the electrolyte in space 12 is a freely movable insulating ball 33 of a nonconducting inorganic material, like sapphire, and having a surface which is very nearly perfectly smooth and very nearly perfectly round.

The inside surface 34 of center electrode 11 has a hard surface cylindrically finished by random honing or similar process to assure the smooth rolling of ball 33 therealong as well as to give uniform electrical resistance between each unit of its surface and the electrolyte. The inner, electrolyte contacting, surfaces of the end terminals 23, 24 may be chromium plated and polished to assure uniform electrical conditions between each surface unit thereof and the electrolyte.

As shown in the drawing, an electrical circuit in which my gravity sensing potentiometer has been found to be especially useful comprises an alternating current power source, A. C., connected at one side to ground, G1, and at the other side to center electrode 11. End terminals 23, 24 of my potentiometer are connected to the respective outer ends of a transformer T primary coil having two parts P1 and P2 in series. At the junction of parts P1 and P2 the primary coil is connected to ground at G2. Inductively coupled equally to both parts P1 and P2 of transformer T is the secondary coil S thereof.

With the circuit arrangement shown it is seen that there will be two parallel circuits in that part of the series circuit between G1 and G2 which is between the power source A. C. and the common connection of transformer primary coil parts P1 and P2 and ground connection G2. The current flow through one of the parallel circuit paths is governed by the resistance of the electrolyte path between center terminal 11 and end terminal 23. The current flow through the other of the parallel circuit paths is governed by the resistance of the electrolyte path between center terminal 11 and end terminal 24. It is apparent that if the potentiometer 10 is longitudinally level, ball 33 will be midway between end terminals 23, 24 and the electric current through each of the parallel circuits will be equal and of the same phase or instantaneous electrical direction and magnitude. Thus currents of equal instantaneous magnitudes will enter the outer ends of coil parts P1 and P2, and pass through the coil parts to group G. But since coil parts P1 and P2 are of opposite coupling phase with respect to secondary coil S, there will be no voltage induced in coil S.

However, when the potentiometer is minutely tilted to the right as shown in the drawing ball 33 will roll to the right and if sufficiently tilted will finally contact end terminal 24. The sapphire ball carries no current but as it moves from end to end of its path it greatly varies the relative cross sectional areas of the current paths through the electrolyte from center electrode 11 to the two end electrodes 23, 24. In one form in which I have practiced my invention the electrolyte with which the space 12 is filled is a five percent solution of sodium iodide in ethyl alcohol having a specific resistance of about 1000 ohms per centimeter cube. The resistance through the electrolyte path between the end electrodes as partially paralleled by the center electrode is a total of 1400 ohms. When ball 33 is at the terminal 24 end, as shown in the drawing, the resistance through the electrolyte from end terminal 24 to center terminal 11 is about 100 ohms while the resistance through the electrolyte between end terminal 23 and center terminal 11 is 1300 ohms.

It is thus seen that the potentiometer currents are notably sensitive to minute changes of position of ball 33 and, of course, the voltage induced in secondary coil S will be equally responsive. But when ball 33 is in its centered or null position the equal currents through coil parts P1 and P2 will induce no voltage in coil S. Yet when ball 33 is away from its centered position in either direction a voltage will be induced in coil S and it will have a magnitude proportional to the departure of ball 33 from its neutral position and the induced voltage will have an instantaneous direction of opposite signs depending on the direction ball 33 has moved away from its neutral position.

A particularly valuable utility I have found for my novel potentiometer is as a part of a continuous erecting means for a gravity vertical gyroscope when the potentiometer here shown takes the place of two of the gravity sensitive mercury switches now commonly used to sense the tilt of the gyroscope away from the vertical in either direction in a common plane. In this case the terminals of secondary coil S are connected to excite one of the windings of a two phase torquer motor used to erect the gyroscope towards the vertical in either direction along a single vertical plane.

Having thus disclosed some of the objects of my invention, illustrated and described a preferred form in which my invention may be practiced and explained its operation, I claim:

1. Means for erecting a vertical gyroscope from either direction in a vertical plane by a two phase torquer motor, one winding of which is continuously excited from an electrical source of power; said means including a second source of electrical power, a gravity sensing potentiometer and circuit means connecting said second source of power, said potentiometer and the other winding of said two phase motor to excite said other winding of said motor with electric current of one phase when the vertical axis of said gyroscope departs from its gravity vertical position in one direction in said plane and to excite said other winding of said motor with electric current of an opposite phase when the vertical axis of said gyroscope departs from its gravity vertical position in the other direction in said plane; said circuit means including a transformer having a primary winding connected across the end terminals of said potentiometer and a secondary winding connected in series with said other winding of said motor; said circuit means connecting the fixed midpoint of said primary winding through said second power source to the center terminal of said potentiometer and said potentiometer including gravity sensing means for varying the relative resistance between its center terminal and its respective end terminals.

2. A gravity vertical sensing potentiometer for continuously controlling the erection from either of two opposite directions in a vertical plane of a gravity vertical gyroscope, the erection forces being provided by a reversible two phase motor one winding of which is continuously excited from a first power source and the other winding of which is intermittently excited from a second power source, the supply of power to said second winding being controlled by said potentiometer to be of one phase for erection of said gyroscope in one direction in said plane and of opposite phase for erection of said gyroscope in the other direction in said plane, said potentiometer comprising a resistor having a pair of opposite end terminals and intermediate terminal together with gravity sensing means for varying the relative resistances of the parts of said resistor connected between said intermediate terminal and the respective end terminals, said intermediate terminal of said potentiometer including an electrically conducting rigid cylinder having a smoothly cylindrical inner surface, said end terminals comprising electrically conducting means insulatedly and hermetically sealed concentrically into the opposite ends of said rigid cylinder, said resistor comprising a liquid fill of an electrolyte for said cylinder and said gravity sensing means comprising a smoothly spherical inorganic electric insulator slightly smaller in diameter than the inside of said cylinder.

3. A gravity vertical sensing potentiometer comprising an electrically conducting rigid cylinder having a smoothly cylindrical inner surface, a pair of opposite end terminals of electrically conducting material insulatedly and hermetically sealed concentrically into the opposite ends of said rigid cylinder, an electrically conducting liquid fill for the interior of said cylinder and a smoothly spherical electrical insulator slightly smaller in diameter than the inside of said cylinder immersed in said liquid.

4. The potentiometer of claim 3 in which the inner end of each of said end terminals is finished at its inner end in a plane surface perpendicular to the axis of said cylinder and about one third the diameter of said ball, said spherical electrical insulator being free to roll along the inner surface of said cylinder for a distance equal to about one fourth the diameter of said ball, each of said end terminals being radially spaced from said cylinder by an annular electrical insulator extending axially inwardly around its end terminal beyond the end of said terminal, each of said annular insulators being finished at its inner end with an approximately spherical surface approximately concentric with said spherical insulator when said spherical insulator is at its nearest position thereto, said plane and surfaces of said end terminals being spaced to limit the approach of said spherical insulator to the respective approximately spherical surfaces of said annular insulators to set maximum resistance limits of the electrical paths through said electrolyte from said cylinder to said end terminals.

5. A gravity vertical sensing potentiometer comprising a rigid electrically conducting cylinder about five sixteenths inch inside diameter and three fourths inch long having coaxial electrically conducting end terminals sealed into the ends thereof by a respective pair of electrically insulating supports therefor, the interior of said cylinder being filled with a five percent solution of sodium iodide in ethyl alcohol and a sapphire ball about nine thirty-seconds inch outside diameter immersed in said solution.

6. A gravity vertical sensing potentiometer comprising means forming a space filled with an electrolyte and having a gravity responsive free piston immersed therein, a pair of spaced end terminals and an intermediate terminal each insulatedly spaced from the other except through said electrolyte, the resistance of the electric path through said electrolyte being substantially irresponsive to the position of said piston, and the proportion of the total resistance of the path between said end terminals which is between one of said end terminals and said mid terminal being a function of the position of said piston relative to said one of said end terminals.

References Cited in the file of this patent

UNITED STATES PATENTS

| | | |
|---|---|---|
| 2,367,465 | Kunzer | Jan. 16, 1945 |
| 2,720,116 | Furst | Oct. 11, 1955 |
| 2,803,965 | Machover | Aug. 27, 1957 |